United States Patent
Ärlig et al.

(10) Patent No.: US 11,169,530 B1
(45) Date of Patent: Nov. 9, 2021

(54) OUTDOOR ROBOTIC WORK TOOL COMPRISING AN ENVIRONMENTAL DETECTION SYSTEM

(71) Applicant: Husqvarna AB, Huskvarna (SE)

(72) Inventors: Ulf Ärlig, Bankeryd (SE); Jimmy Petersson, Jönköping (SE)

(73) Assignee: HUSQVARNA AB, Huskvarna (SE)

( * ) Notice: Subject to any disclaimer, the term of this patent is extended or adjusted under 35 U.S.C. 154(b) by 0 days.

(21) Appl. No.: 17/313,207

(22) Filed: May 6, 2021

(30) Foreign Application Priority Data

May 8, 2020 (SE) .................... 2050539-2

(51) Int. Cl.
*G01S 13/00* (2006.01)
*G05D 1/02* (2020.01)

(52) U.S. Cl.
CPC ......... *G05D 1/0214* (2013.01); *G05D 1/0257* (2013.01)

(58) Field of Classification Search
CPC ............... G05D 1/0257; G05D 1/028; G05D 2201/0208; Y10S 901/01; G01S 7/4811; G01S 17/87; B25J 9/0003; A47L 2201/04
(Continued)

(56) References Cited

U.S. PATENT DOCUMENTS

| | | |
|---|---|---|
| 4,189,903 A | 2/1980 | Jackson et al. |
| 4,232,505 A | 11/1980 | Walto |

(Continued)

FOREIGN PATENT DOCUMENTS

| | | |
|---|---|---|
| CN | 205946577 U | 2/2017 |
| CN | 208027167 A | 10/2018 |

(Continued)

OTHER PUBLICATIONS

Swedish Search Report from related Swedish application No. 2050539-2 filed on May 8, 2020, all pages enclosed cited in its entirety.

(Continued)

*Primary Examiner* — Dalena Tran
(74) *Attorney, Agent, or Firm* — Burr & Forman, LLP (57) ABSTRACT

The present disclosure relates to an outdoor robotic work tool (1) adapted for a forward travelling direction (D) and comprising an environmental detection system (19) that comprises a set of outer detector transceivers (2a, 2b) and a set of inner detector transceivers (3a, 3b), where the inner detector transceivers (3a, 3b) are positioned between the outer detector transceivers (2a, 2b). Each detector transceiver (2a, 2b; 3a, 3b) is adapted to transmit signals (4a, 4b; 5a, 5b) and to receive reflected signals (6a, 6b, 9) that have been reflected by an object (10, 11). The outer detector transceivers (2a, 2b) are associated with outer coverage main directions (7a, 7b) that are directed at corresponding outer angles ($\alpha_a$, $\alpha_b$) to the forward travelling direction (D), and the inner detector transceivers (3a, 3b) are associated with inner coverage main directions (8a, 8b) that are directed at corresponding inner angles ($\beta_a$, $\beta_b$) to the forward travelling direction (D). The inner angles ($\beta_a$, $\beta_b$) have magnitudes that exceed the magnitudes of the outer angles ($\alpha_a$, $\alpha_b$), and the inner coverage main directions (8a, 8b) intersect in front of the outdoor robotic work tool (1) in the forward travelling direction (D).

11 Claims, 6 Drawing Sheets

(58) Field of Classification Search
USPC .................. 700/245, 258; 701/23; 180/167
See application file for complete search history.

(56) References Cited

U.S. PATENT DOCUMENTS

| | | | |
|---|---|---|---|
| 5,211,722 A | 5/1993 | Wagner | |
| 5,212,938 A | 5/1993 | Zenner et al. | |
| 5,638,668 A | 6/1997 | Kallevig et al. | |
| 6,615,108 B1* | 9/2003 | Peless | G05D 1/0219 |
| | | | 180/167 |
| 2004/0165968 A1 | 8/2004 | Logiudice | |
| 2004/0202512 A1 | 10/2004 | Smith | |
| 2005/0251292 A1* | 11/2005 | Casey | G05D 1/0242 |
| | | | 700/245 |
| 2006/0293794 A1* | 12/2006 | Harwig | G05D 1/0261 |
| | | | 700/253 |
| 2007/0016328 A1* | 1/2007 | Ziegler | A47L 7/0028 |
| | | | 700/245 |
| 2012/0023887 A1 | 2/2012 | Messina et al. | |
| 2015/0166060 A1 | 6/2015 | Smith | |
| 2015/0181805 A1 | 7/2015 | Elonsson | |
| 2018/0169863 A1 | 6/2018 | Bushman et al. | |
| 2018/0235146 A1 | 8/2018 | Hashimoto et al. | |

FOREIGN PATENT DOCUMENTS

| | | |
|---|---|---|
| CN | 208027167 U | 10/2018 |
| EP | 0531071 A1 | 3/1993 |
| EP | 3508048 A1 | 7/2019 |
| GB | 2289848 A | 12/1995 |
| JP | 0585205 U | 11/1993 |
| JP | 0787823 A | 4/1995 |
| WO | 03013223 A1 | 2/2003 |
| WO | 2006064345 A2 | 6/2006 |
| WO | 2007083459 A1 | 7/2007 |
| WO | 2014007729 A1 | 1/2014 |
| WO | 2019157841 A1 | 8/2019 |
| WO | 2020171753 A1 | 8/2020 |

OTHER PUBLICATIONS

Office Action and Search Report for Swedish Application No. 2050539-2 dated Dec. 15, 2020.
International Search Report and Written Opinion in International Application No. PCT/SE2020/050608 dated Dec. 16, 2020.
Office Action and Search Report for Swedish Application No. 2050612-7 dated Feb. 3, 2021.
Office Action and Search Report for Swedish Application No. 1950230-1 dated Sep. 11, 2019.

* cited by examiner

OUTDOOR ROBOTIC WORK TOOL COMPRISING AN ENVIRONMENTAL DETECTION SYSTEM

TECHNICAL FIELD

The present disclosure relates to outdoor robotic work tool comprising an environmental detection system with a set of outer detector transceivers and a set of inner detector transceivers. The outdoor robotic work tool can for example be constituted by a robotic lawn mower.

BACKGROUND

Automated or robotic power tools such as robotic lawn mowers are becoming increasingly more popular. In a typical deployment a work area, such as a garden, the work area is enclosed by a boundary wire with the purpose of keeping the robotic lawn mower inside the work area. An electric control signal may be transmitted through the boundary wire thereby generating an (electro-) magnetic field emanating from the boundary wire. The robotic working tool is typically arranged with one or more sensors adapted to sense the control signal.

The robotic lawn mower can then cut grass on a user's lawn automatically and can be charged automatically without intervention of the user, and no longer needs to be manually managed after being set once. The robotic lawn mower needs to have a function of recognizing an obstacle to avoid colliding with the obstacle before encountering the obstacle, and to have a function of recognizing that a collision has occurred.

In the latter case, a collision sensor can be disposed on the body of the robotic lawn mower, and when the robotic lawn mower collides with an obstacle, the body moves in such a way that the collision sensor generates a collision signal. In the former case, different kinds of environment detection sensors are use such as ultrasonic sensors as disclosed in EP3508048 and radar sensors as disclosed in SE540794.

There is, however, a need to improve the coverage, reliably and efficiency of such environment detection sensors such that all obstacles are detected in time such that a collision can be avoided by stopping the robotic lawn mower and/or turning the robotic lawn mower away from the obstacle.

SUMMARY

The object of the present disclosure is to provide a robotic work tool with environment detection system that has an improved coverage, reliably and efficiency compared to prior art.

This object is achieved by means of an outdoor robotic work tool adapted for a forward travelling direction and comprising an environmental detection system that comprises a set of outer detector transceivers and a set of inner detector transceivers, where the inner detector transceivers are positioned between the outer detector transceivers. Each detector transceiver is adapted to transmit signals and to receive reflected signals that have been reflected by an object. The outer detector transceivers are associated with outer coverage main directions that are directed at corresponding outer angles to the forward travelling direction, and the inner detector transceivers are associated with inner coverage main directions that are directed at corresponding inner angles to the forward travelling direction. The inner angles have magnitudes that exceed the magnitudes of the outer angles, and the inner coverage main directions intersect in front of the outdoor robotic work tool in the forward travelling direction.

This means that a robotic work tool with an increased sensor coverage is provided, increasing the robotic work tool's ability to avoid collisions with other objects.

According to some aspects, each coverage main direction is associated with a corresponding transceiver coverage, where a combined rectangular coverage having a certain width is formed in front of the outdoor robotic work tool in the forward travelling direction, where the combined coverage comprises at least two separate transceiver coverages.

Forming such a combined area increases the reliability of the detections.

According to some aspects, the outer angles are of the same magnitude and the inner angles are of the same magnitude.

According to some aspects, the outer coverage main directions do not intersect in front of the outdoor robotic work tool in the forward travelling direction.

In this way an increased coverage is enabled.

According to some aspects, the outer coverage main directions are mutually parallel.

In this way, a desirable combined area is formed.

According to some aspects, the detector transceivers are adapted to transmit signals at least partly at the same time.

In this way, objects in front of the robotic work tool are detected in a quicker and more efficient manner.

According to some aspects, the detector transceivers are any one of radar transceivers, ultrasonic transceivers or Lidar transceivers.

This means that the present disclosure is applicable for many types of detector transceivers.

According to some aspects, the robotic work tool is a robotic lawn mower.

According to some aspects, the robotic work tool comprises a first outer detector transceiver, a second outer detector transceiver, a first inner detector transceiver and a second inner detector transceiver.

According to some aspects, the robotic work tool comprises a propulsion motor arrangement, a power source adapted to provide power to the propulsion motor arrangement and a plurality of wheels, where at least two wheels are adapted to be propelled by the propulsion motor arrangement. The robotic work tool further comprises a control unit that is adapted to control the detector transceivers and to control the speed and direction of the robotic work tool in dependence of information acquired by means of the of the detector transceivers when the robotic work tool is moving.

In this manner, a safe and reliable control of the robotic work tool is provided.

According to some aspects, the detector transceivers are adapted to transmit signals at the same time at all detector transceivers or at the same time at two or more detector transceivers, in the same or in different constellations at different times. Alternatively, or in combination, the detector transceivers are adapted to transmit signals at only one detector transceiver at a time at certain times.

This means that the simultaneous transmission can be adapted either for different need that arise in dependence of detection results and/or in dependence of a certain predetermined scheduling.

According to some aspects, each detector transceiver is adapted to transmit a signal comprising a specific signal identification, such that a received signal can be identified with respect to its transmitting detector transceivers. According to some aspects, the signal identification is accomplished by means of utilizing different waveforms or embedded identifications codes.

In this way, specific details such as for example azimuth heading and/or distance can be provided for the detected objects.

The present disclosure also relates to methods that are associated with above advantages.

BRIEF DESCRIPTION OF THE DRAWINGS

The present disclosure will now be described more in detail with reference to the appended drawings, where.

DETAILED DESCRIPTION

Aspects of the present disclosure will now be described more fully hereinafter with reference to the accompanying drawings. The different devices, systems, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

It should be noted that even though the description given herein will be focused on robotic lawn mowers, the teachings herein may also be applied to any type of outdoor robotic work tool, such as for example robotic ball collectors, robotic mine sweepers and robotic farming equipment.

Figure 1:
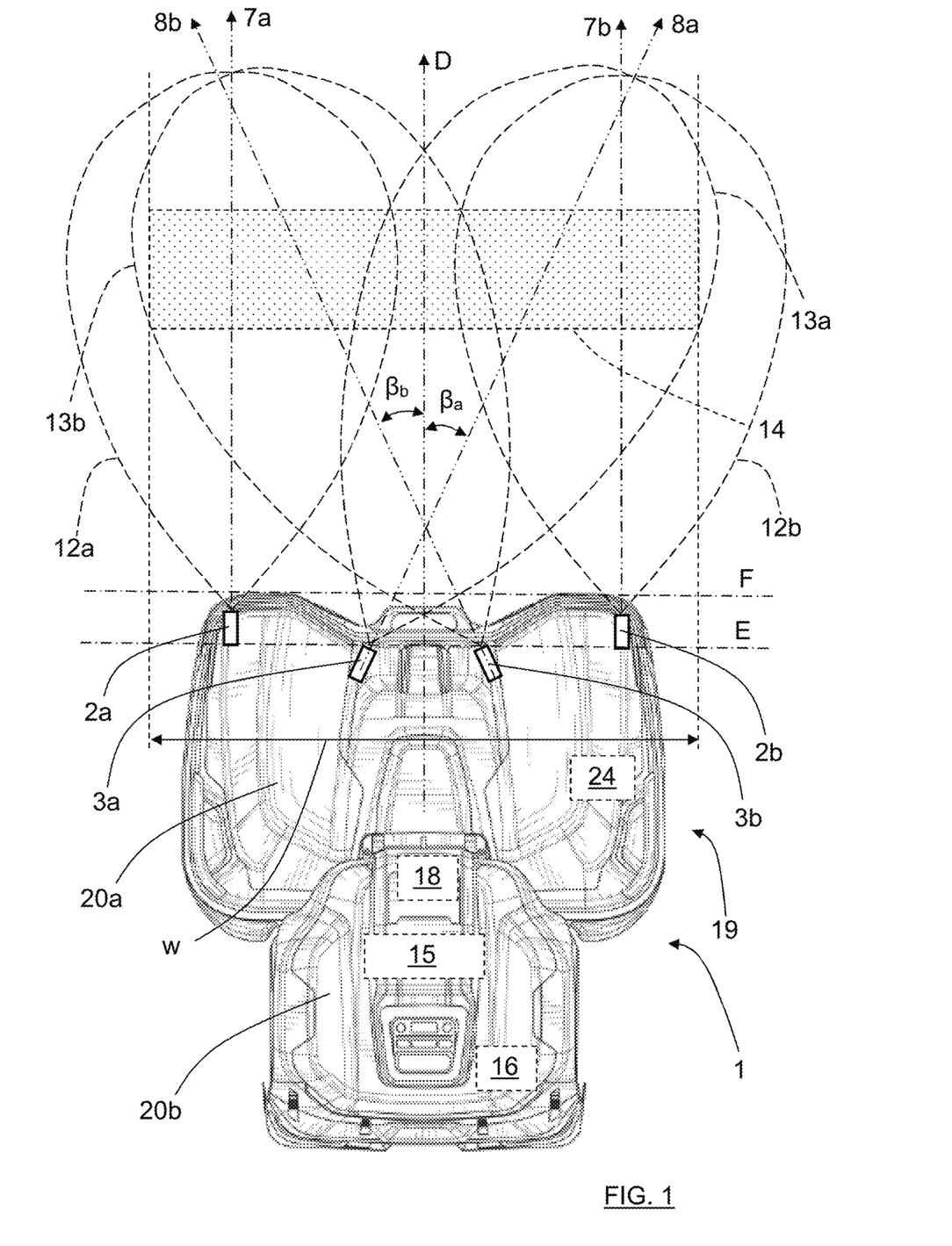
FIG. 1 shows a first schematic top view of a lawn mower.
Figure 4:
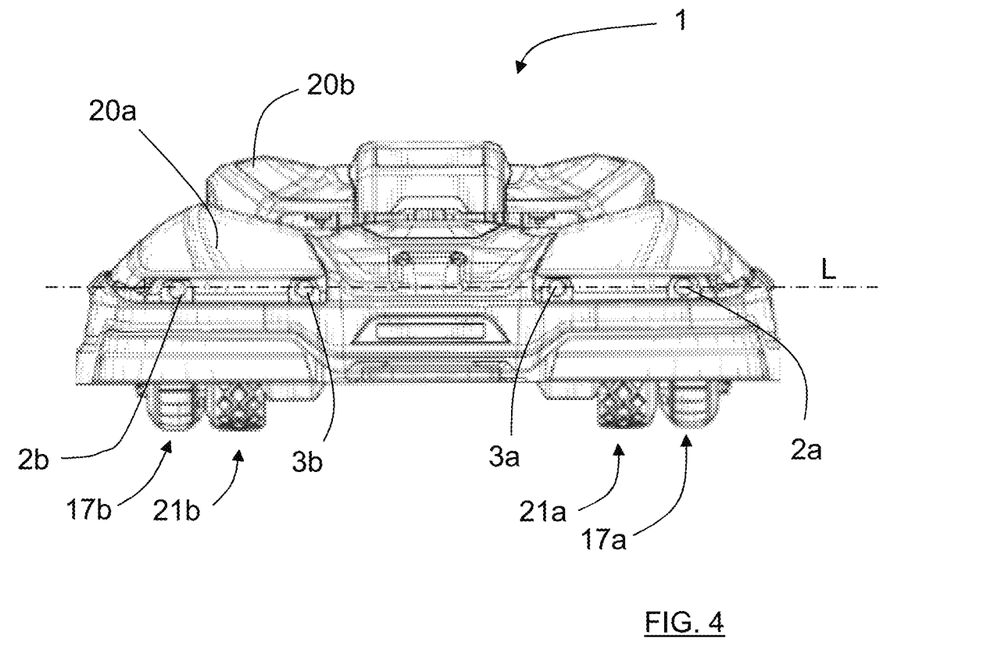
FIG. 4 shows a schematic front view of a lawn mower.
Figure 5:
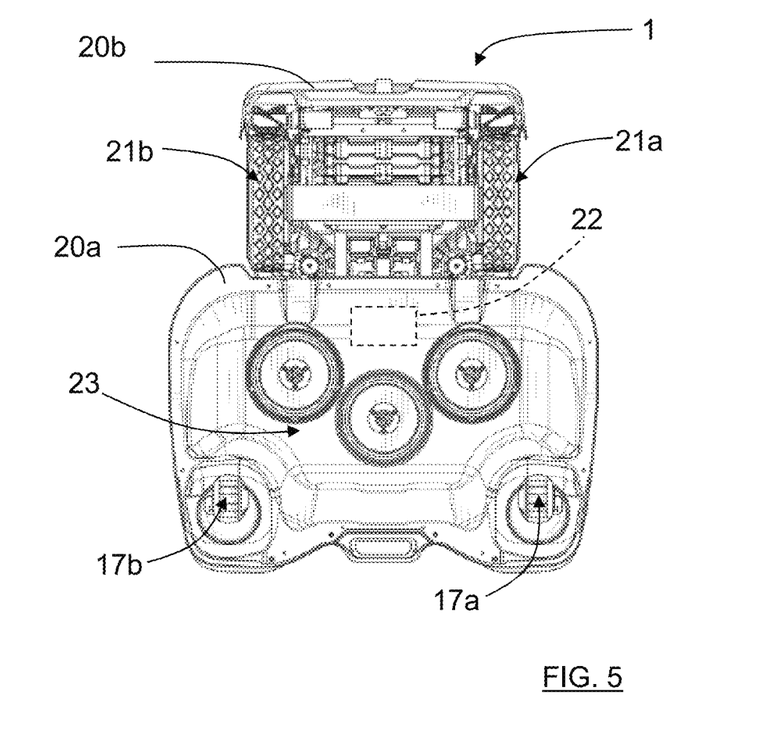
FIG. 5 shows a schematic bottom view of a lawn mower.

FIG. 1 shows a top view of a robotic working tool 1, FIG. 4 shows a front view of the robotic working tool 1 and FIG. 5 shows a bottom view of the robotic working tool 1, here exemplified by a robotic lawn mower 1. The robotic lawn mower 1 comprises a body 20a, 20b, a propulsion motor arrangement 15, a power source 16 such as a rechargeable battery adapted to provide power to the propulsion motor arrangement 15, and a plurality of wheels 17a, 17b; 21a, 21b, where two or more of the wheels, according to some aspects two rear wheels 21a, 21b, are adapted to be propelled by the propulsion motor arrangement 15, enabling the robotic working tool 1 to move with respect to a forward travelling direction D. It is of course possible that all four wheels 17a, 17b; 21a, 21b are adapted to be propelled by the propulsion motor arrangement 15.

The robotic lawn mower 1 also comprises a grass cutting device 23, in this example a plurality of cutting blade arrangements driven by a cutter motor arrangement 22 that also is powered by the power source 16 or, alternatively, by a separate power source. The grass cutting device is an example of a general work tool for a robotic work tool.

According to some aspects, the propulsion motor arrangement 15 comprises one separate propulsion motor for each wheel 17a, 17b; 21a, 21b to be driven, and according to some further aspects, the cutter motor arrangement 22 comprises one separate cutter motor for each cutting blade arrangement.

It should be noted that even if the description herein is focused on electric motors, combustion engines may alternatively be used, possibly in combination with an electric motor.

The robotic lawn mower 1 further comprises a control unit 18. The robotic lawn mower 1 may be a multi-chassis type or a mono-chassis type. A multi-chassis type comprises more than one body parts that are movable with respect to one another. A mono-chassis type comprises only one main body part. In this example there is a front body part 20a and a rear body part 20b.

The robotic lawn mower 1 typically comprises charging skids 28 for contacting contact plates in a charging station when docking into the charging station for receiving a charging current through, and possibly also for transferring information by means of electrical communication between the charging station and the robotic lawn mower 1. Other means of establishing a charging contact are possible and are incorporated herein.

In a previously well-known manner, the robotic lawn mower 1 is adapted to navigate with reference to a boundary wire emitting a magnetic field caused by a control signal transmitted through the boundary wire. The robotic lawn mower is further configured to detect the magnetic field and for detecting the boundary wire, for example by means of one or more magnetic field sensors. It is also conceivable that the robotic lawn mower 1 is adapted to navigate without a boundary wire, other navigation systems are conceivable, for example navigation systems based on GPS and/or one or more wireless communication systems.

The robotic lawn mower 1 further comprises an environmental detection system 19 that comprises a set of outer detector transceivers 2a, 2b and a set of inner detector transceivers 3a, 3b. The inner detector transceivers 3a, 3b are positioned between the outer detector transceivers 2a, 2b along an extension E that is perpendicular to the forward travelling direction D. According to some aspects, all detector transceivers 2a, 2b; 3a, 3b are positioned along the extension E, and one or more detector transceiver can according to some further aspects be mutually displaced along the forward travelling direction D. In this example the inner detector transceivers 3a, 3b are displaced along the forward travelling direction D with respect to the outer detector transceivers 2a, 2b as will be discussed more later.

It is also conceivable that the detector transceivers 2a, 2b; 3a, 3b are positioned along an extension that is inclined with respect to the forward travelling direction D, or that the detector transceivers 2a, 2b; 3a, 3b are positioned in an irregular manner. According to some aspects, the inner detector transceivers 3a, 3b are positioned between the outer detector transceivers 2a, 2b along an extension and one or more detector transceiver can according to some further aspects be mutually displaced in a direction perpendicular to that extension. That extension can be any suitable extension, not having to be the extension E that is perpendicular to the forward travelling direction D.

Figure 3:
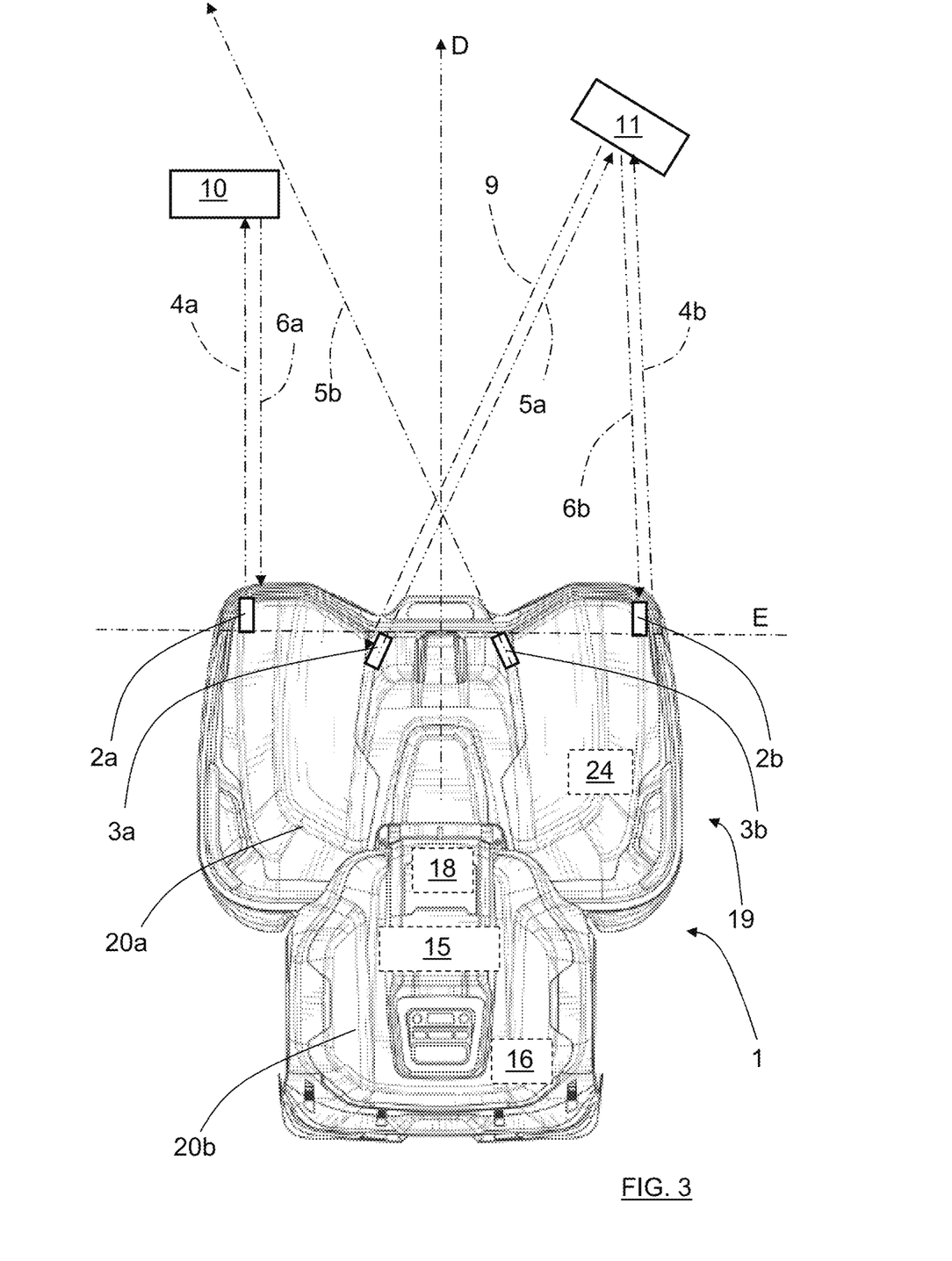
FIG. 3 shows a third schematic top view of a lawn mower.

With reference also to FIG. 3, Each detector transceiver 2a, 2b; 3a, 3b is adapted to transmit signals 4a, 4b; 5a, 5b and to receive reflected signals 6a, 6b, 9 that have been reflected by an object 10, 11. According to some aspects, the detector transceivers 2a, 2b; 3a, 3b are ultrasonic detector transceivers, being adapted to transmit and receive ultrasonic signals. This should not be regarded as limiting; the detector transceivers 2a, 2b; 3a, 3b can of any suitable kind such as for example radar transceivers or Lidar transceivers, applying a corresponding well-known technology for transmitting and receiving reflected signals. To enable this, according to some aspects, each detector transceiver 2a, 2b; 3a, 3b comprises a corresponding transmitter arrangement and receiver arrangement together with other necessary circuitry in a well-known manner.

The detector transceivers 2a, 2b; 3a, 3b can be arranged in many ways within the scope of the present disclosure, according to some aspects there is a first outer detector transceiver 2a, a second outer detector transceiver 2b, a first inner detector transceiver 3a and a second inner detector transceiver 3b. According to some aspects, all detector transceivers 2a, 2b; 3a, 3b are positioned at a common horizontal level L as indicated in FIG. 4. Other position arrangements are of course conceivable.

Figure 2:
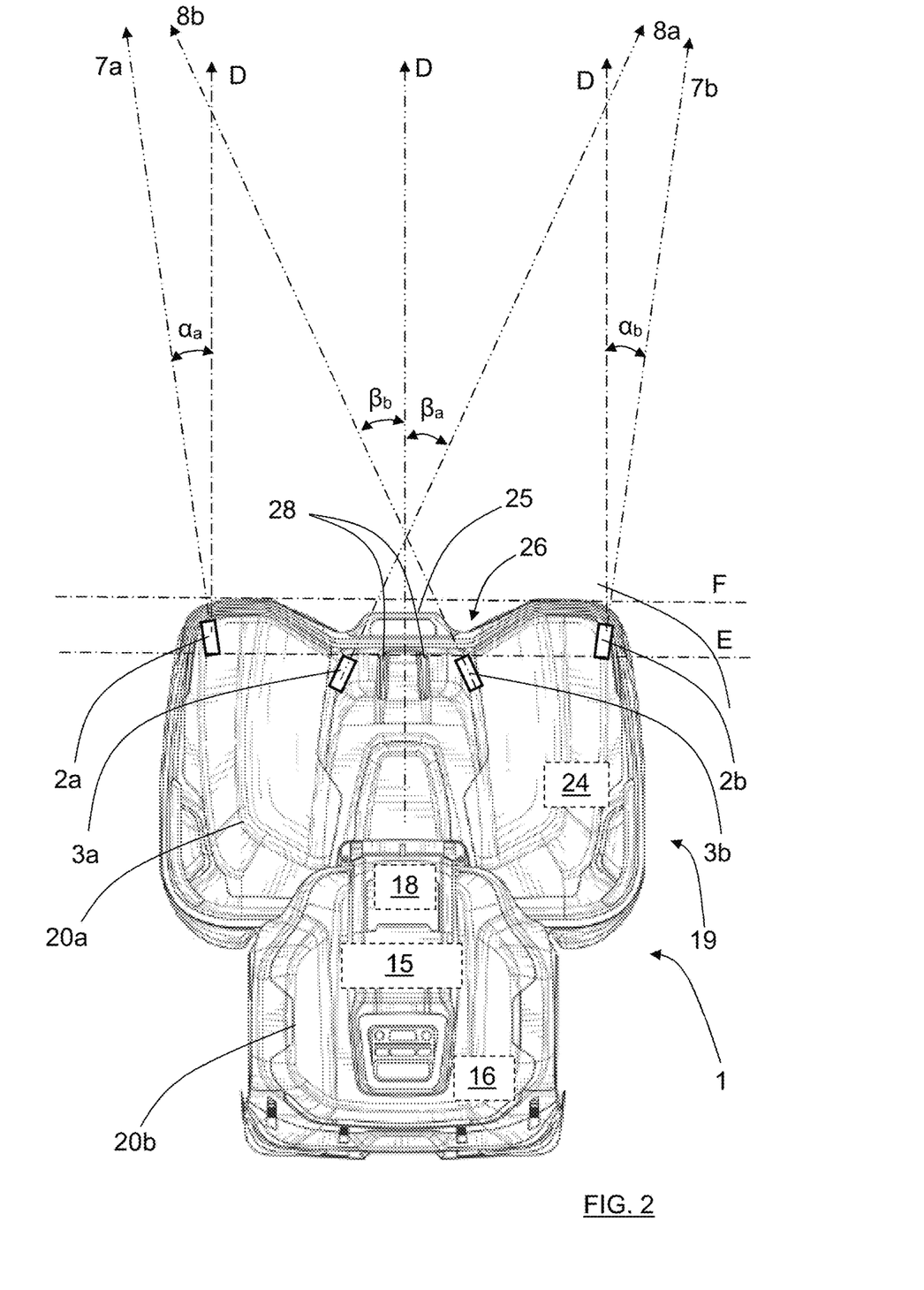
FIG. 2 shows a second schematic top view of a lawn mower.

With reference also to FIG. 2, the outer detector transceivers 2a, 2b are associated with outer coverage main directions 7a, 7b that are directed at corresponding outer angles $\alpha_a$, $\alpha_b$ to the forward travelling direction D, and the inner detector transceivers 3a, 3b are associated with inner coverage main directions 8a, 8b that are directed at corresponding inner angles $\beta_a$, $\beta_b$ to the forward travelling direction D.

According to the present disclosure, the inner angles $\beta_a$, $\beta_b$ have magnitudes that exceed the magnitudes of the outer angles $\alpha_a$, $\alpha_b$, and the inner coverage main directions 8a, 8b intersect in front of the outdoor robotic work tool 1 in the forward travelling direction D. According to some aspects, the outer angles $\alpha_a$, $\alpha_b$ are of the same magnitude and the inner angles $\beta_a$, $\beta_b$ are of the same magnitude.

In FIG. 1, in accordance with some aspects, the outer angles $\alpha_a$, $\alpha_b$ are zero degrees, the outer coverage main directions 7a, 7b being parallel and coinciding with the forward travelling direction D. In FIG. 2, in accordance with some aspects, the outer angles $\alpha_a$, $\alpha_b$ have a certain magnitude and are directed such that the outer coverage main directions 7a, 7b do not intersect in front of the outdoor robotic work tool 1 in the forward travelling direction D. It is also conceivable that the outer coverage main directions 7a, 7b do intersect in front of the outdoor robotic work tool 1.

As only shown in FIG. 1 for reasons of clarity, according to some aspects, each coverage main direction 7a, 7b; 8a, 8b is associated with a corresponding transceiver coverage 12a, 12b; 13a, 13b, where the associated main direction 7a, 7b; 8a, 8b indicates a direction in which that transceiver coverage 12a, 12b; 13a, 13b has a maximum range. A combined rectangular coverage 14, having a certain width w, is formed in front of the outdoor robotic work tool 1 in the forward travelling direction D, where the combined coverage 14 comprises at least two separate transceiver coverages 12a, 12b; 13a, 13b. According to some aspects, the width w is equal to or exceeds to a maximum width of the robotic lawn mower 1, where said width w extends in a direction orthogonal to the forward travelling direction D. In FIG. 1, the width w is shown to exceed the maximum width of the robotic lawn mower 1.

By means of the relation of the coverage main directions 7a, 7b; 8a, 8b, a larger combined rectangular coverage 14, comprising at least two separate transceiver coverages 12a, 12b; 13a, 13b, is achieved than previously possible. This enables objects in the path of the robotic lawn mower 1 to be detected in an efficient and reliable manner, in particular earlier than previously possible, such that all obstacles are detected in time such that a collision can be avoided by stopping the robotic lawn mower 1 and/or turning the robotic lawn mower 1 away from the obstacle.

For this purpose, as shown in FIG. 1 and FIG. 2, the robotic lawn mower 1 comprises a control unit 18 that is adapted to control the detector transceivers 2a, 2b; 3a, 3b and to control the speed and direction of the robotic work tool 1 in dependence of information acquired by means of the of the detector transceivers 2a, 2b; 3a, 3b when the robotic lawn mower 1 is moving. The control unit 18 can be constituted by several separate control sub-units or one single integrated control unit. The control unit 18 is adapted to perform all necessary signal processing necessary for controlling the detector transceivers 2a, 2b; 3a, 3b and to acquire the desired information from the detected measurement results.

Should a collision occur anyway, at least the front body part 20a is movable and in contact with a collision sensor 24 as illustrated in FIG. 1 and being adapted to detect that the front body part 20a has been displaced to such a degree that a collision most likely has occurred. One or more collision sensors can be used for each one body part, preferably all body parts 20a, 20b, here only one collision sensor 24 is shown as an example. The control unit 18 that is adapted to control the speed and direction of the robotic work tool 1 in dependence of information from said collision sensor 24 s well, for example to reverse the movement direction when a possible collision has been detects.

As indicated in FIG. 2, in accordance with some aspects, the robotic lawn mower 1 comprises a handle part 25 that is provided for lifting and handling the robotic lawn mower 1 when necessary, for example for service, inspection and/or cleaning. The handle part 25 is placed closer to the ground than the detector transceivers 2a, 2b; 3a, 3b when the robotic lawn mower 1 is operating, and is positioned in a front recess 26 such that it does not protrude as a frontmost part. This means that the first outer detector transceiver 2a and the second outer detector transceiver 2b are positioned closer to a front line F of the robotic lawn mower 1 than the first inner detector transceiver 3a and the second inner detector transceiver 3b, and in other words, the inner detector transceivers 3a, 3b are displaced along the forward travelling direction D with respect to the outer detector transceivers 2a, 2b.

As a consequence, the handle part 25 does not disturb the operation of the inner detector transceivers 3a, 3b, and the front recess 26 is formed such that the front body parts 20a does not disturb the operation of the inner detector transceivers 3a, 3b, mainly by causing unwanted reflections. By means of the present design, a front wheel pair 17a, 17b, the so-called caster wheels 17a, 17b, can be arranged as close to the front line F as possible and as spaced apart as possible for increased stability of the robotic lawn mower 1.

In accordance with some further aspects of the present disclosure, with reference to in particular FIG. 3, the detector transceivers 2a, 2b; 3a, 3b are adapted to transmit signals 4a, 4b; 5a, 5b at the same time. This means that in the illustrated example, where there is a first object 10 and a second object 11 in front of the robotic lawn mower 1, the first object 10 will be detected by the first outer detector transceiver 2a by means of a first signal 4a transmitted by the first outer detector transceiver 2a that results in a second signal 6a, reflected from the first object 10, that is received by the first outer detector transceiver 2a.

Furthermore, the second object 11 will be detected by the second outer detector transceiver 2b since a third signal 5a transmitted by the first inner detector transceiver 3a results in a fourth signal 6b, reflected from the second object 11, that is received by the second outer detector transceiver 2b.

The second object 11 will also be detected by the first inner detector transceiver 3a since a fifth signal 4b transmitted by the second outer detector transceiver 2b results in a sixth signal 9, reflected from the second object 10, that is received by the first inner detector transceiver 3a.

Since the detector transceivers 2a, 2b; 3a, 3b are adapted to transmit signals 4a, 4b; 5a, 5b at the same time, detection of reflected signals will indicate the presence of one or more objects ahead, but not more specific details such as for example azimuth heading and/or distance, since a signal received at one detector transceivers can result from a signal transmitted from any one of the detector transceivers 2a, 2b; 3a, 3b. Normally it is sufficient for a robotic lawn mower 1 to be informed about the fact that there is one or more objects ahead in order to avoid a collision. Should a more specific detection be desired and/or required, each detector transceivers 2a, 2b; 3a, 3b can be adapted to transmit specific signals, such that a received signal can be identified with respect to its transmitting detector transceivers 2a, 2b; 3a, 3b. Such an identification can for example be accomplished by means of utilizing different waveforms or embedded identifications codes for the transmitted signals 4a, 4b, 5a, 5b.

Generally, at least two detector transceivers 2a, 2b; 3a, 3b are adapted to transmit signals 4a, 4b; 5a, 5b and to receive reflected signals 6a, 6b, 9 that have been reflected by an object 10, 11, where the detector transceivers 2a, 2b; 3a, 3b are adapted to transmit signals 4a, 4b; 5a, 5b at least partly at the same time. This means that several alternatives are possible, separately or in combination. For example:

the detector transceivers 2a, 2b; 3a, 3b always transmit signals at the same time, two or more detector transceivers transmit signals at the same time, in the same or in different constellations at different times, and/or at some times, only one detector transceiver 2a, 2b; 3a, 3b at a time transmits signals.

This means that the simultaneous transmission can be adapted either for different need that arise in dependence of detection results and/or in dependence of a certain predetermined scheduling.

Having a signal transmitted by one detector transceiver 2a, 2b; 3a, 3b being detectable by any one of the detector transceivers 2a, 2b; 3a, 3b increases the possibility that an object 10, 11 in front of the robotic lawn mower 1 is detected.

It should be noted that the second inner detector transceiver 3b transmits a signal 5b where the transceiver coverage 13b indicated in FIG. 1 implies that the signal 5b will be reflected by the first object 10, but where a reflected signal will travel away from the robotic lawn mower 1 and not be detected by any detector transceiver.

Figure 6:
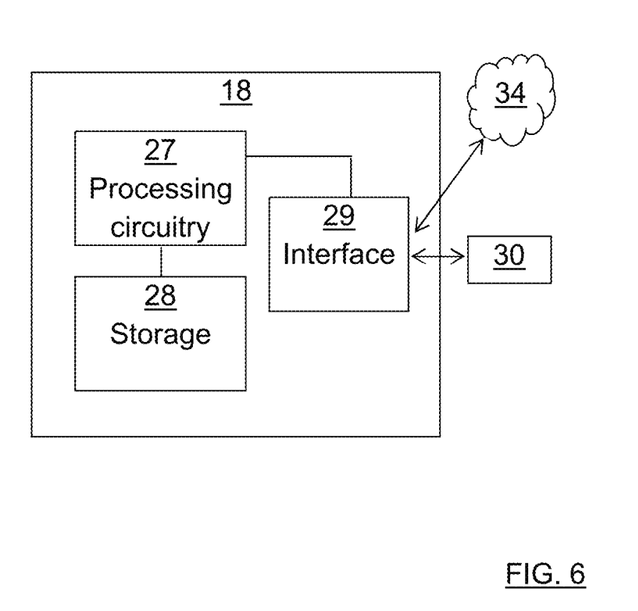
FIG. 6 schematically illustrates processing circuitry.

FIG. 6 schematically illustrates, in terms of a number of functional units, the components of the control unit 18 according to embodiments of the discussions herein. Processing circuitry 27 is provided using any combination of one or more of a suitable central processing unit CPU, multiprocessor, microcontroller, digital signal processor DSP, etc., capable of executing software instructions stored in a computer program product, e.g. in the form of a storage medium 28. The processing circuitry 27 may further be provided as at least one application specific integrated circuit ASIC, or field programmable gate array FPGA. The processing circuitry thus comprises a plurality of digital logic components.

Particularly, the processing circuitry 27 is configured to cause the control unit 18 to perform a set of operations, or steps to control the operation of the robotic lawn mower 1 including, but not being limited to, controlling the detector transceivers 2a, 2b; 3a, 3b, processing measurements results received via the detector transceivers 2a, 2b; 3a, 3b, and the propulsion of the robotic lawn mower 1. For example, the storage medium 28 may store the set of operations, and the processing circuitry 27 may be configured to retrieve the set of operations from the storage medium 28 to cause the control unit 18 to perform the set of operations. The set of operations may be provided as a set of executable instructions. Thus, the processing circuitry 27 is thereby arranged to execute methods as herein disclosed.

The storage medium 28 may also comprise persistent storage, which, for example, can be any single one or combination of magnetic memory, optical memory, solid state memory or even remotely mounted memory.

According to some aspects, the control unit 18 further comprises an interface 29 for communications with at least one external device such as a control panel 30 or an external device. As such the interface 29 may comprise one or more transmitters and receivers, comprising analogue and digital components and a suitable number of ports for wireline communication. The interface 29 can be adapted for communication with other devices 34, such as a server, a personal computer or smartphone, the charging station, and/or other robotic working tools. Examples of such wireless communication devices are Bluetooth®, WiFie (IEEE802.11b), Global System Mobile (GSM) and LTE (Long Term Evolution), to name a few.

Figure 7:
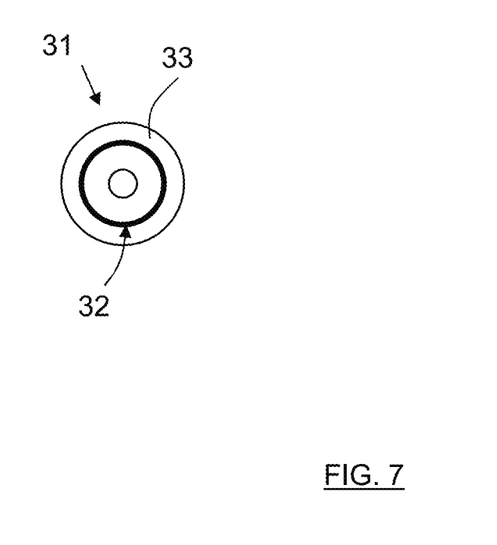
FIG. 7 shows a computer program product.

FIG. 7 shows a computer program product 31 comprising computer executable instructions 32 stored on media 33 to execute any of the methods disclosed herein.

Figure 8:
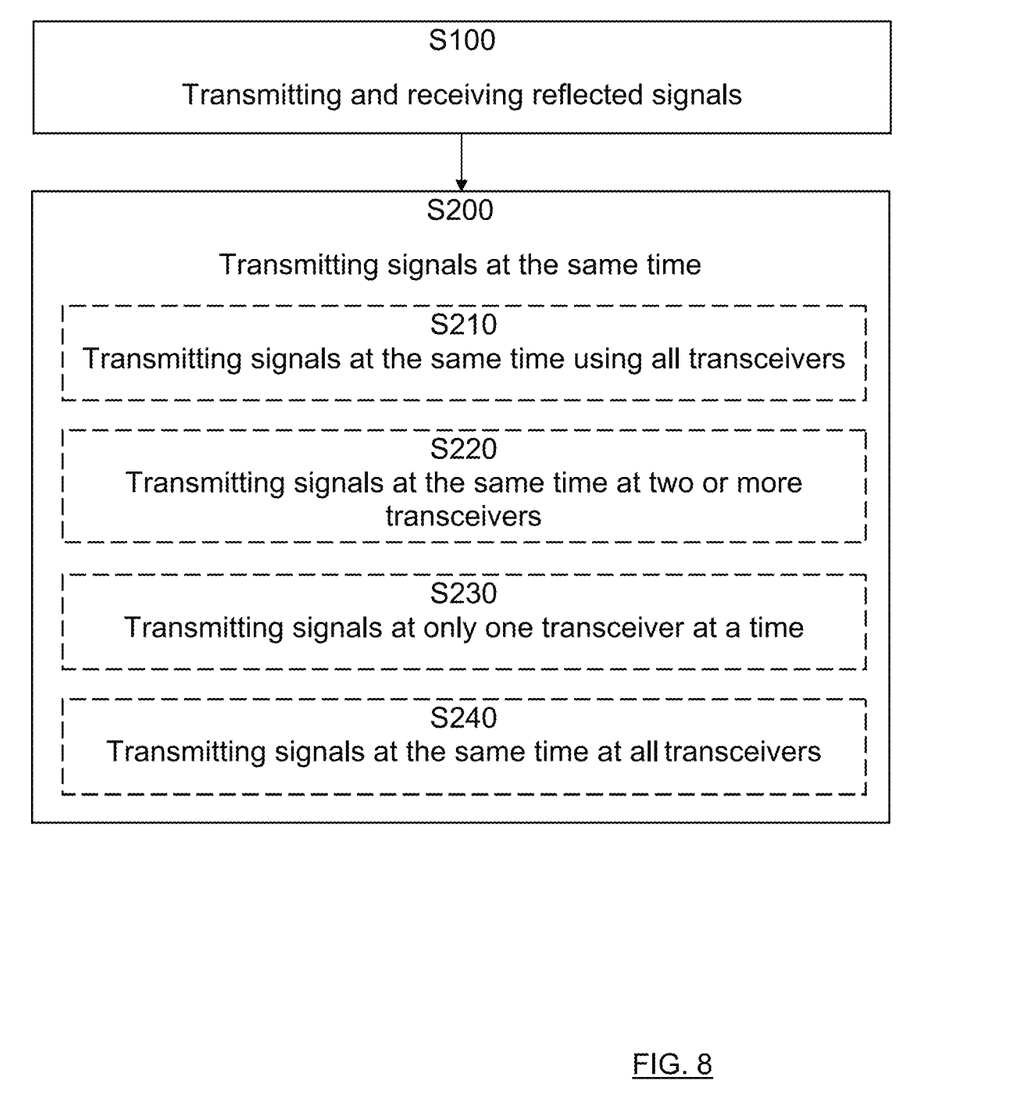
FIG. 8 shows a flowchart for methods according to the present disclosure.

With reference to FIG. 8, the present disclosure also relates to a method in an outdoor robotic work tool 1 adapted for a forward travelling direction D, where the method comprises transmitting and receiving S100 reflected signals 6a, 6b, 9 that have been reflected by an object 10, 11 using at least two detector transceivers 2a, 2b; 3a, 3b, and transmitting S200 signals 4a, 4b; 5a, 5b at all detector transceivers 2a, 2b; 3a, 3b at least partly at the same time.

According to some aspects, the method further comprises transmitting S210 signals at the same time at all detector transceivers 2a, 2b; 3a, 3b.

According to some aspects, the method further comprises transmitting S220 signals at the same time at two or more detector transceivers, in the same or in different constellations at different times.

According to some aspects, the method further comprises transmitting S230 signals at only one detector transceiver 2a, 2b; 3a, 3b at a time at certain times.

According to some aspects, the method further comprises transmitting S240 a signal comprising a specific signal identification at each detector transceiver 2a, 2b; 3a, 3b, such that a received signal can be identified with respect to its transmitting detector transceiver 2a, 2b; 3a, 3b.

According to some aspects, the signal identification is accomplished by means of utilizing different waveforms or embedded identifications codes.

Generally, the present disclosure relates to an outdoor robotic work tool 1 adapted for a forward travelling direction D and comprising an environmental detection system 19 that comprises a set of outer detector transceivers 2a, 2b and a set of inner detector transceivers 3a, 3b, where the inner detector transceivers 3a, 3b are positioned between the outer detector transceivers 2a, 2b. Each detector transceiver 2a, 2b; 3a, 3b is adapted to transmit signals 4a, 4b; 5a, 5b and to receive reflected signals 6a, 6b, 9 that have been reflected by an object 10, 11. The outer detector transceivers 2a, 2b are associated with outer coverage main directions 7a, 7b that are directed at corresponding outer angles $\alpha_a$, $\alpha_b$ to the forward travelling direction D, and the inner detector transceivers 3a, 3b are associated with inner coverage main directions 8a, 8b that are directed at corresponding inner angles $\beta_a$, $\beta_b$ to the forward travelling direction D. The inner angles $\beta_a$, $\beta_b$ have magnitudes that exceed the magnitudes of the outer angles $\alpha_a$, $\alpha_b$, and the inner coverage main directions 8a, 8b intersect in front of the outdoor robotic work tool 1 in the forward travelling direction D.

According to some aspects, each coverage main direction 7a, 7b; 8a, 8b is associated with a corresponding transceiver coverage 12a, 12b; 13a, 13b, where a combined rectangular coverage 14 having a certain width w is formed in front of the outdoor robotic work tool 1 in the forward travelling direction D. The combined coverage 14 comprises at least two separate transceiver coverages 12a, 12b; 13a, 13b.

According to some aspects, the outer angles $\alpha_a$, $\alpha_b$ are of the same magnitude and the inner angles $\beta_a$, $\beta_b$ are of the same magnitude.

According to some aspects, the outer coverage main directions 7a, 7b do not intersect in front of the outdoor robotic work tool 1 in the forward travelling direction D.

According to some aspects, the outer coverage main directions 7a, 7b are mutually parallel.

According to some aspects, the detector transceivers 2a, 2b; 3a, 3b are adapted to transmit signals 4a, 4b; 5a, 5b at least partly at the same time.

According to some aspects, the detector transceivers 2a, 2b; 3a, 3b are any one of radar transceivers, ultrasonic transceivers or Lidar transceivers.

According to some aspects, the robotic work tool 1 is a robotic lawn mower.

According to some aspects, the robotic work tool 1 comprises a first outer detector transceiver 2a, a second outer detector transceiver 2b, a first inner detector transceiver 3a and a second inner detector transceiver 3b.

According to some aspects, the robotic work tool 1 comprises a propulsion motor arrangement 15, a power source 16 adapted to provide power to the propulsion motor arrangement 15, a plurality of wheels 17a, 17b; 21a, 21b where at least two wheels are adapted to be propelled by the propulsion motor arrangement 15, and a control unit 18 that is adapted to control the detector transceivers 2a, 2b; 3a, 3b and to control the speed and direction of the robotic work tool 1 in dependence of information acquired by means of the of the detector transceivers 2a, 2b; 3a, 3b when the robotic work tool 1 is moving.

Generally, the present disclosure also relates to an outdoor robotic work tool 1 adapted for a forward travelling direction D and comprising an environmental detection system that comprises at least two detector transceivers 2a, 2b; 3a, 3b that are adapted to transmit signals 4a, 4b; 5a, 5b and to receive reflected signals 6a, 6b, 9 that have been reflected by an object 10, 11. The detector transceivers 2a, 2b; 3a, 3b are adapted to transmit signals 4a, 4b; 5a, 5b at least partly at the same time.

According to some aspects, the robotic work tool 1 comprises a set of outer detector transceivers 2a, 2b, a set of inner detector transceiver 3a, 3b, where the inner detector transceivers 3a, 3b are positioned between the outer detector transceivers 2a, 2b, where the outer detector transceivers 2a, 2b are associated with outer coverage main directions 7a, 7b that are directed at corresponding outer angles $\alpha_a$, $\alpha_b$ to the forward travelling direction D, and the inner detector transceivers 3a, 3b are associated with inner coverage main directions 8a, 8b that are directed at corresponding inner angles $\beta_a$, $\beta_b$ to the forward travelling direction D, wherein the inner angles $\beta_a$, $\beta_b$ have magnitudes that exceed the magnitudes of the outer angles $\alpha_a$, $\alpha_b$, and where the inner coverage main directions 8a, 8b intersect in front of the outdoor robotic work tool 1 in the forward travelling direction D.

According to some aspects, the detector transceivers 2a, 2b; 3a, 3b are adapted to transmit signals at the same time at all detector transceivers 2a, 2b; 3a, 3b.

According to some aspects, the detector transceivers 2a, 2b; 3a, 3b are adapted to transmit signals at the same time at two or more detector transceivers, in the same or in different constellations at different times.

According to some aspects, the detector transceivers 2a, 2b; 3a, 3b are adapted to transmit signals at only one detector transceiver 2a, 2b; 3a, 3b at a time at certain times.

According to some aspects, each detector transceiver 2a, 2b; 3a, 3b is adapted to transmit a signal comprising a specific signal identification, such that a received signal can be identified with respect to its transmitting detector transceivers 2a, 2b; 3a, 3b.

According to some aspects, the signal identification is accomplished by means of utilizing different waveforms or embedded identifications codes.

The present disclosure is not limited to the above, but may vary freely within the scope of the appended claims. For example, each detector transceivers 2a, 2b; 3a, 3b comprises associated well-known components such as a signal generator, a transmitting and receiving device such as a ultrasonic emitter/receiver arrangement or an transmitting/receiving antenna arrangement, and receiver circuitry. Each detector transceivers 2a, 2b; 3a, 3b can be directly controlled by the control unit 18, or comprise a sub-controller that is controlled by, and adapted to communicate with, the control unit 18.

The invention claimed is:

1. An outdoor robotic work tool adapted for a forward travelling direction and comprising an environmental detection system that comprises a set of outer detector transceivers and a set of inner detector transceivers, wherein the inner detector transceivers are positioned between the outer detector transceivers, wherein each of the inner and outer detector transceivers is adapted to transmit signals and to receive reflected signals that have been reflected by an object, wherein the outer detector transceivers are associated with outer coverage main directions that are directed at corresponding outer angles to the forward travelling direction, and the inner detector transceivers are associated with inner coverage main directions that are directed at corresponding inner angles to the forward travelling direction, wherein the inner angles have magnitudes that exceed the magnitudes of the outer angles, and wherein the inner coverage main directions intersect in front of the outdoor robotic work tool in the forward travelling direction.

2. The outdoor robotic work tool according to claim 1, wherein each of the inner and outer coverage main directions is associated with a corresponding transceiver coverage, wherein a combined rectangular coverage having a certain width is formed in front of the outdoor robotic work tool in the forward travelling direction, wherein the combined rectangular coverage comprises at least two separate transceiver coverages.

3. The outdoor robotic work tool according to claim 1, wherein the outer angles are equal to each other in magnitude and the inner angles are equal to each other in magnitude.

4. The outdoor robotic work tool according to claim 1, wherein the outer coverage main directions do not intersect in front of the outdoor robotic work tool in the forward travelling direction.

5. The outdoor robotic work tool according to claim 1, wherein the outer coverage main directions are mutually parallel.

6. The outdoor robotic work tool according to claim 1, wherein the detector transceivers are adapted to transmit signals at least partly at the same time.

7. The outdoor robotic work tool according to claim 1, wherein the detector transceivers are any one of radar transceivers, ultrasonic transceivers or Lidar transceivers.

8. The outdoor robotic work tool according to claim 1, wherein the robotic work tool is a robotic lawn mower.

9. The outdoor robotic work tool according to claim 1, wherein the robotic work tool comprises a first outer detector transceiver, a second outer detector transceiver, a first inner detector transceiver and a second inner detector transceiver.

10. The outdoor robotic work tool according to claim 1, wherein the robotic work tool comprises a propulsion motor arrangement, a power source adapted to provide power to the propulsion motor arrangement, a plurality of wheels wherein at least two wheels are adapted to be propelled by the propulsion motor arrangement, and a control unit that is adapted to control the detector transceivers and to control a speed and direction of the robotic work tool in dependence of information acquired by means of the of the detector transceivers when the robotic work tool is moving.

11. An outdoor robotic work tool adapted for a forward travelling direction and comprising an environmental detection system that comprises at least two detector transceivers that are adapted to transmit signals and to receive reflected signals that have been reflected by an object, wherein the detector transceivers are adapted to transmit signals at least partly at the same time, wherein the robotic work tool comprises a set of outer detector transceivers, a set of inner detector transceiver, wherein the inner detector transceivers are positioned between the outer detector transceivers, wherein the outer detector transceivers are associated with outer coverage main directions that are directed at corresponding outer angles to the forward travelling direction, and the inner detector transceivers are associated with inner coverage main directions that are directed at corresponding inner angles to the forward travelling direction, wherein the inner angles have magnitudes that exceed the magnitudes of the outer angles, and where the inner coverage main directions intersect in front of the outdoor robotic work tool in the forward travelling direction.

* * * * *